(12) United States Patent
Pels et al.

(10) Patent No.: US 8,136,615 B2
(45) Date of Patent: Mar. 20, 2012

(54) METHOD FOR OPERATING AN INTERNAL COMBUSTION ENGINE

(75) Inventors: Thomas Pels, Heiden (DE); Paul Kapus, Judendorf (AT); Peter Ebner, Graz (AT); Robert Fischer, Graz (AT); Günter Fraidl, Graz (AT); Wolfgang Kriegler, Graz (AT); Carsten Kaup, Coesfeld (DE)

(73) Assignee: AVL List GmbH, Graz (AT)

( * ) Notice: Subject to any disclaimer, the term of this patent is extended or adjusted under 35 U.S.C. 154(b) by 973 days.

(21) Appl. No.: 11/991,311

(22) PCT Filed: Aug. 31, 2006

(86) PCT No.: PCT/AT2006/000359
§ 371 (c)(1),
(2), (4) Date: Oct. 28, 2008

(87) PCT Pub. No.: WO2007/025319
PCT Pub. Date: Mar. 8, 2007

(65) Prior Publication Data
US 2009/0133946 A1    May 28, 2009

(30) Foreign Application Priority Data

Sep. 1, 2005   (AT) .............................. A 1432/2005
Sep. 22, 2005  (AT) .............................. A 1565/2005
Nov. 24, 2005  (AT) .............................. A 1904/2005
Nov. 29, 2005  (AT) .............................. A 1927/2005

(51) Int. Cl.
*B60W 10/06* (2006.01)
*B60W 10/08* (2006.01)
*B60W 10/24* (2006.01)

(52) U.S. Cl. ............... 180/65.28; 180/65.29; 180/65.31; 180/65.285

(58) Field of Classification Search ............... 180/65.21, 180/65.23, 65.275, 65.28, 65.285, 65.29, 180/65.31
See application file for complete search history.

(56) References Cited

U.S. PATENT DOCUMENTS

| | | | |
|---|---|---|---|
| 6,554,088 B2* | 4/2003 | Severinsky et al. | 180/65.23 |
| 7,665,559 B2* | 2/2010 | De La Torre-Bueno | 180/65.29 |
| 7,775,310 B2* | 8/2010 | Andri | 180/65.28 |
| 7,792,628 B2* | 9/2010 | Aswani et al. | 701/103 |
| 2002/0179047 A1* | 12/2002 | Hoang et al. | 123/350 |
| 2004/0163860 A1 | 8/2004 | Matsuzaki | |
| 2006/0237250 A1* | 10/2006 | Kowatari et al. | 180/242 |
| 2006/0278449 A1* | 12/2006 | Torre-Bueno | 180/65.2 |

FOREIGN PATENT DOCUMENTS

| | | |
|---|---|---|
| DE | 4133014 | 4/1993 |
| DE | 19532325 | 9/1996 |
| EP | 1253702 | 10/2002 |
| EP | 1522450 | 4/2005 |
| JP | 60256027 | 12/1985 |
| JP | 60256028 | 12/1985 |
| JP | 60256029 | 12/1985 |
| JP | 2003041966 | 2/2003 |
| JP | 20031334607 | 5/2003 |

OTHER PUBLICATIONS

English Abstract of JP2003041966.

(Continued)

*Primary Examiner* — John R Olszewski

(74) *Attorney, Agent, or Firm* — Dykema Gossett PLLC

(57) ABSTRACT

A method for operating a hybrid drive in a vehicle with an internal combustion engine and at least one electric machine connected thereto which is in connection with at least one energy storage device including operating the internal combustion engine is operated in overload mode in at least one preferably exceptional operating situation of the hybrid drive in order to avoid power losses at low loading state of the energy storage device.

21 Claims, 3 Drawing Sheets

OTHER PUBLICATIONS

English Abstract of JP60256029.
English Abstract of JP60256028.
English Abstract of JP60256027.
English Abstract of JP2003134607.
English Abstract of DE19532325.
English Abstract of EP1253702.
English Abstract of DE4133014.

* cited by examiner

METHOD FOR OPERATING AN INTERNAL COMBUSTION ENGINE

BACKGROUND OF THE INVENTION

1. Field of the Invention

The invention relates to a method for operating a hybrid drive in a vehicle with an internal combustion engine and at least one electric machine connected thereto which is in connection with an energy storage device. The invention further relates to a method for determining differences in compression in a multi-cylinder internal combustion engine which is mechanically rigidly connected with a preferably variable-speed electric induction machine. The invention further relates to a method for operating an internal combustion engine, especially a hybrid vehicle which comprises at least one exhaust turbocharger and at least one oil pump. The invention further relates to a method for operating a vehicle which comprises a serial hybrid drive train with at least one internal combustion engine and at least a first and second electric machine, with the first electric machine being operated in the manner of a generator by the internal combustion engine in at least one operating range and the second electric machine driving at least one drive wheel of the vehicle in a direct or indirect manner.

2. The Prior Art

A control system for a hybrid vehicle is known from JP 2003-041966 A, in which the internal combustion engine compensates a torque loss of the electric machine when the electric machine is not ready for operation.

The electric machine of a hybrid shall increase driving power in many cases by positive moment (boosting function). The reproducibility of this function is problematic, especially in the case that the energy storage device is depleted or the electric machine is unable to provide its maximum output, e.g. due to overheating. In known systems, such situations will lead to drops in performance of the vehicle drive which the driver may neither foresee nor understand.

The compression of the cylinders is conventionally measured via the spark plug or glow plug bores. This is relatively time-consuming because spark plugs or glow plugs need to be removed prior to measurement.

A device for testing an internal combustion engine is known from JP 60256029 A2. The internal combustion engine is driven by an electromotor and the drive torque is measured.

JP 60256028 A2 and JP 60256027 A2 also disclose similar methods. The amount of the frictional resistances is derived on the basis of the measured torque.

Especially in the case of hybrid vehicles with an internal combustion engine with turbocharger, the lubrication of the turbocharger is critical during the switch-off process of the internal combustion engine after an operating phase with high speed (e.g. in so-called start-stop operation) because the oil pump, which is driven by the internal combustion engine for example, will no longer convey any lubricating oil after switch-off although the turbocharger can still run at high speed.

A control device for the generator of an electric vehicle is known from JP 2003-134608 A2, with the operating range of the vehicle being distinguished in manned and unmanned operation. In manned operation, the generator is stopped as soon as a predetermined loading state of the battery has been reached. In unmanned operation, the generator is driven in such a way that it will supply the more current to the battery the lower its loading state is.

JP 2003-134607 A2 describes a similar method.

In the case of vehicles with serial hybrid drive train, the internal combustion engine is operated with constant nominal speed for driving the first electric machine. This allows high efficiency, low consumption and low emissions. Such vehicles are used for example in the operation of public-transit buses. The disadvantageous aspect is that especially during the standstill of the vehicle in the area of the bus stops for example there will be a relatively high noise development by the internal combustion engine.

It is the object of the invention to avoid such disadvantages and to improve the drive behaviour of a hybrid vehicle. It is also the object of the invention to provide a method with which the compression of the individual cylinders can be determined with as little effort as possible. It is a further object of the invention to enable sufficient lubrication of the turbocharger during the cut-off process. It is further an object of the invention to reduce the noise emissions in vehicles with serial hybrid drive trains.

SUMMARY OF THE INVENTION

This is achieved in accordance with the invention in such a way that the internal combustion engine is operated in overload mode in at least one preferably exceptional operating situation of the hybrid drive.

It is preferably provided that the internal combustion engine is operated in overload mode when the loading state of the energy storage device falls under a minimum value and/or the demanded power is higher than the sum total of the driving power of the internal combustion engine and the electric machine.

Especially in hazardous situations, a sufficiently high torque can be provided to overcome critical situations through temporary overload operation of the internal combustion engine.

The internal combustion engine is operated in an "overload manner" in overload operation without taking into account the emissions and fatigue strength. This occurs by larger injected quantities, changed ignition point, increased boost pressure, etc.

It is especially advantageous when the internal combustion engine is operated in overload mode when, outside of the proper application area of the electric machine, the full drive power of the internal combustion engine operated in normal load mode is demanded and additionally charge power for loading the energy storage device is to be provided. In this way it is possible to provide sufficient drive torque and recharge the empty energy storage device.

It is further advantageous when the internal combustion engine, within the ordinary application area of the electric machine, is operated in overload mode when respective drive power is demanded and support power for the internal combustion engine operated in normal load mode is not available by the electric machine.

By additional enrichment of the mixture and/or by increasing the boost pressure of the charged internal combustion engine and/or by adjusting the control times or the stroke of the charge-changing valves it is possible to operate the same in overload mode.

The energy management is designed in such a way that in the case of repeated starting and acceleration processes the consumed and recharged energy is the same and thus enables reciprocating operation.

A displacement of the load point can be made via the transmission which can be arranged as a manual transmission or dual clutch transmission. The gear ratio in the last gear can be designed at 40 to 55 kph for 1000 $\text{min}^{-1}$ engine speed.

As an alternative to this, a displacement of the load point can also be achieved by loading the electric machine or supporting the internal combustion engine by the electric machine.

During the so-called "turbo lag", the electric machine can be operated in a supporting manner in order to compensate power losses in this phase.

When the vehicle is driven only electrically by the electric machine, then it is advantageous to separate the internal combustion engine from the drive train by a clutch in order to avoid drag losses.

It is also possible to reduce the friction of the dragged internal combustion engine by adjusting the control times, change of valve stroke or valve deactivation.

Double-layer capacitors are best suited for rapid recharging processes. Rechargeable batteries can be used as energy storage device for normal hybrid functions however. It is especially advantageous when, depending on the requirements, different energy storage devices are used, i.e. both double-layer capacitors as well as batteries.

In order to determine the compression of individual cylinders in a simple manner it is provided that phase currents and/or the phase voltages and the speed of the induction machine are measured continuously or discontinuously and the torque on the shaft of the induction machine is derived therefrom, and that the torque curve is associated with a compression pressure curve, with preferably the internal combustion engine being operated at the measuring time in a non-ignited manner and dragged by the induction machine.

An especially simple measuring possibility is obtained when differences in compression between the cylinders is derived from the different torque peaks.

In the case of field-oriented feedback control systems for induction machines, the torque on the shaft is calculated from phase currents, phase voltage and speed for the torque. Various methods are known which are based on stator, air-gap or rotor flux of the induction machine and differ in the machine model. The common aspect in this method is the goal of determining magnetic flux without any constructional interventions for detection by measurement. The machine model calculates state quantities of the machine which are made available as actual values to the flux and moment controller. In such systems, the torque is the actuating variable for speed and voltage regulations. No additional measured quantities are required in the method in accordance with the invention because the torque is usually calculated anyway for speed and voltage regulation.

The electric induction machine is mechanically rigidly connected with the internal combustion engine. In order to ensure that all working strokes of a cylinder are detected, the torque progression with reference to crank angle is recorded over at least two rotations of the crankshaft. Differences in compression in the individual cylinders can be derived from the torque progression of the induction machine by comparison of the extreme values. The torque amplitude is thereby dependent on the pressure in the cylinders. When an internal combustion engine is cranked in a non-ignited manner by a crankshaft starter-generator, it can be derived from the comparison of the torque amplitudes which cylinder has reduced compression pressure. When the electric induction machine is driven with constant torque, the compression pressure can be derived from the speed progression.

A diagnostic function implemented in the application software can provide information on the compression loss in individual cylinders in a rapid and simple way. It is not necessary to make any mechanical changes such as the removal of spark or glow plugs for example. Optionally, operating points can be found which allow diagnostics during operation of the vehicle and indicate a defect early on.

With the method in accordance with the invention, the compression test by means of a diagnostic function can be substantially simplified with the help of an electric machine. It is especially possible to monitor the cylinder compression continually.

Detailed Description Of The Preferred Embodiment

A sufficient lubrication of the turbocharger during a cut-off process can be achieved when the oil pump is continued to be operated over a minimum coasting period during a cut-off command preferable following a high-load or full-load phase of the internal combustion engine Especially in the case of an oil pump driven by the crankshafts in the internal combustion engine, it is especially advantageous when the internal combustion engine is operated under partial load or idle running for at least a minimum coasting period. When using an electrically drivable oil pump however, it can be provided that the oil pump is operated for at least a minimum coasting period after the cut-off of the internal combustion engine. This ensures a sufficient lubrication of the bearings of the exhaust-gas turbine.

In order to keep the minimum coasting period as short as possible, it is advantageous when the minimum coasting period is determined depending on at least one operating parameter, preferably the speed of the turbocharger, the torque or the injection quantity of the internal combustion engine, preferably at the time of the cut-off command.

In order to reduce noise emissions, it is provided that the internal combustion engine is operated under partial load or idle running at standstill of the vehicle and/or when the vehicle door is opened.

Due to the fact that the internal combustion engine is operated in partial load or in idle running when charging is required, i.e. when the battery charge state is low, the sound pressure level can thus be reduced considerably. Although the internal combustion engine does not run in the optimal operating range, the comfort of the vehicle and thus the acceptance of the drive concept will thus be improved. The operating strategy can be employed not only at bus stops but also at stops caused by the traffic such as before crossings or the like.

The invention is now explained in greater detail below by reference to the drawings.

BRIEF DESCRIPTION OF THE DRAWINGS

FIG. 1 shows a diagram in which the torque M is entered over the engine speed n. $M_E$ designates the torque of the electric machine 3 and $M_M$ the torque of internal combustion engine 2. The part of the torque characteristics of internal combustion engine 2 designated with $M_O$ shows the overload range.

Figure 1:
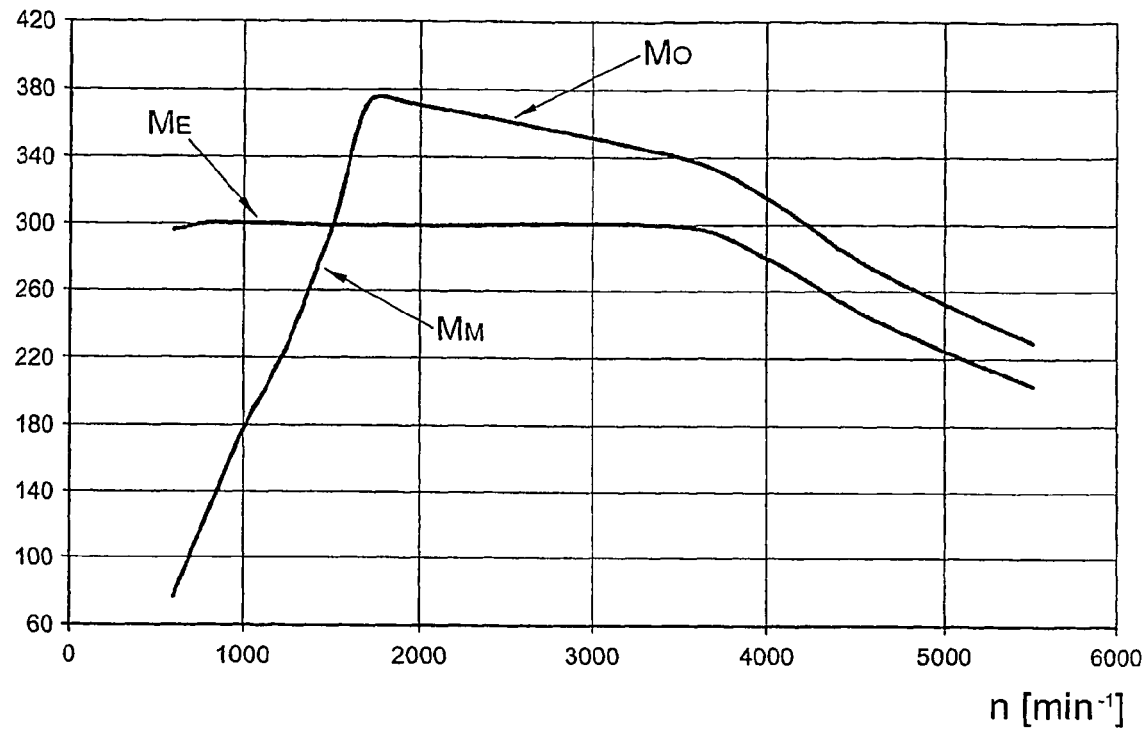
FIG. 1 shows a torque-speed diagram.
Figure 2:
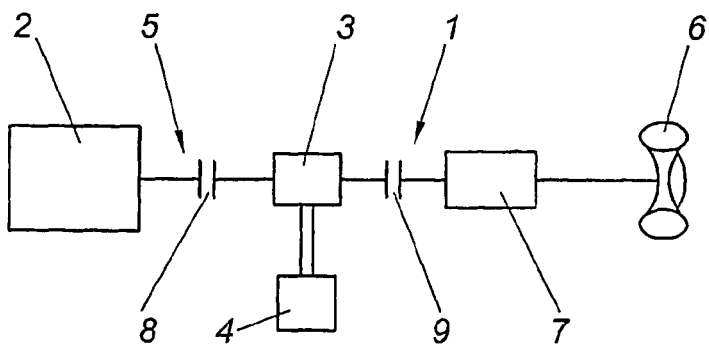
FIG. 2 schematically shows a hybrid drive for performing the method in accordance with the invention.

For realization purposes, a simple hybrid drive 1 (so-called mild hybrid) with an internal combustion engine 2 and an electric machine 3 which is connected with an energy storage device 4 is suitable. The electric machine 3 is mechanically connected with the crankshaft 5 of the internal combustion engine. A transmission 7 which is arranged as a manual transmission or dual clutch transmission for example is arranged in the drive train to the drive wheels 6. The clutch 8 can be arranged between the internal combustion engine 2 and the electric machine 3. It is also possible to install two clutches 8, 9.

In this embodiment, the electric machine 3 supports the internal combustion engine 2 beneath a speed of 1500 min$^{-1}$, so that the torque is obtained as the sum total of the torque $M_M$ of internal combustion engine 2 and torque $M_E$ of electric machine 3. Beyond 1500 min$^{-1}$ the driving torque is only provided by the internal combustion engine 2. The driver is always provided with the same torque. When the energy storage device 4 is empty, the internal combustion engine is operated in overload mode. The energy storage device is loaded and the nominal full-load torque is supplied to the output shaft.

When the energy storage device 4 is emptied after a number of moving off processes it is possible to increase the torque $M_M$ of the internal combustion engine 2 above 1500 min$^{-1}$ to such an extent that loading of the electric energy storage device 4 is enabled, although a torque of approximately 300 Nm is still available for driving the vehicle. This is achieved in such a way that the internal combustion engine 2 is operated by increasing the boost pressure and slight enrichment in overload mode. The overload can also occur for example by changing the control times and/or the valve stroke. A combination of several measures is also possible.

An exemplary critical situation is moving off when on a mountain with a speed only slightly above the idling speed (e.g. 1250 min$^{-1}$). Shifting up to the next gear occurs at 2000 min$^{-1}$ for example. In the operating range from 1250 min$^{-1}$ to 1500 min$^{-1}$, energy is taken from the energy storage device 4 and the electric machine 3 supplies torque. In the operating range between 1500 min$^{-1}$ to 2000 min$^{-1}$, the internal combustion engine 2 is operated in overload mode (when energy storage device 4 is depleted). The torque M which lies over the nominal torque (300 Nm in the example) is used for recharging the energy storage device 4. It is desirable in this respect that at the lowest possible speed n it is possible to recharge the energy storage device 4 with nominal output of the electric machine 3.

It is the goal of the operation that the energy which is required beneath 1500 min$^{-1}$ can be recharged in operation above 1500 min$^{-1}$ up to a switching speed (worst case condition: low switching speed). The overload energy must cover the recharging of the energy storage device 4 and the efficiency of the recharging at the lowest possible speed n.

In contrast to current hybrid concepts, this means the following for the internal combustion engine: The maximum torque (crossover between consumption and recharging) must occur at the lowest possible speeds n. In the case of known hybrid concepts, an especially cost-effective internal combustion engine will be used, or an internal combustion engine which is designed rather for lowest consumption than for best torque.

In contrast to conventional hybrid concepts, the charged internal combustion engine 2 which has a high torque at low speeds allows with the hybrid drive in accordance with the invention a hybrid concept without power split. The displacement of the load point does not mainly occur via power splitting between electric machine 3 and internal combustion engine 2, but via a transmission with long final gear ratio.

Therefore, no power-splitting transmission and consequently no high development and investment costs are required. At the same time, the concept as described here can also be used as an additional function for existing transmissions. A slight additional displacement of the load point is still possible. Costs can thus be reduced substantially.

The electric machine 3 can be used as follows:

Load point displacement: When the energy storage device 4 is provided with sufficient energy, the electric machine 3 can be used in a supporting manner; when the energy storage device is depleted or loadable, it can be used in a loading manner in order to shift the internal combustion engine to the optimal operating point (minimum consumption point).

Transient support: The electric machine 3 can be used for bridging the so-called "turbo lag". During the period of the run-up of the turbocharger, a linear build-up of torque can be ensured by means of the electric machine 3.

Electric driving: It is possible to drive in a purely electric way when the electric energy storage device 4 is sufficiently loaded. In the case of a rigid connection between the electric machine 3 and the internal combustion engine 2, the electric machine 3 is supplied with current in such a way that the unevenness in rotation of the dragged internal combustion engine 2 is compensated. The internal combustion engine 2 is operated in a mode minimizing friction. When using a clutch 8 between electric machine 3 and internal combustion engine 2, it is possible to drive electrically when the internal combustion engine 2 is uncoupled.

The energy storage device 4 can consist of double-layer capacitors (supercaps) and/or conventional rechargeable batteries. Double-layer capacitors are especially suitable for rapid recharging. For electric driving operation it is possible to use rechargeable batteries. In the overall concept it is therefore possible to also use two different energy storage devices.

The method in accordance with the invention is not limited to certain types and arrangements of hybrid concepts, but can rather be used in a large variety of hybrid drives.

Figure 3:
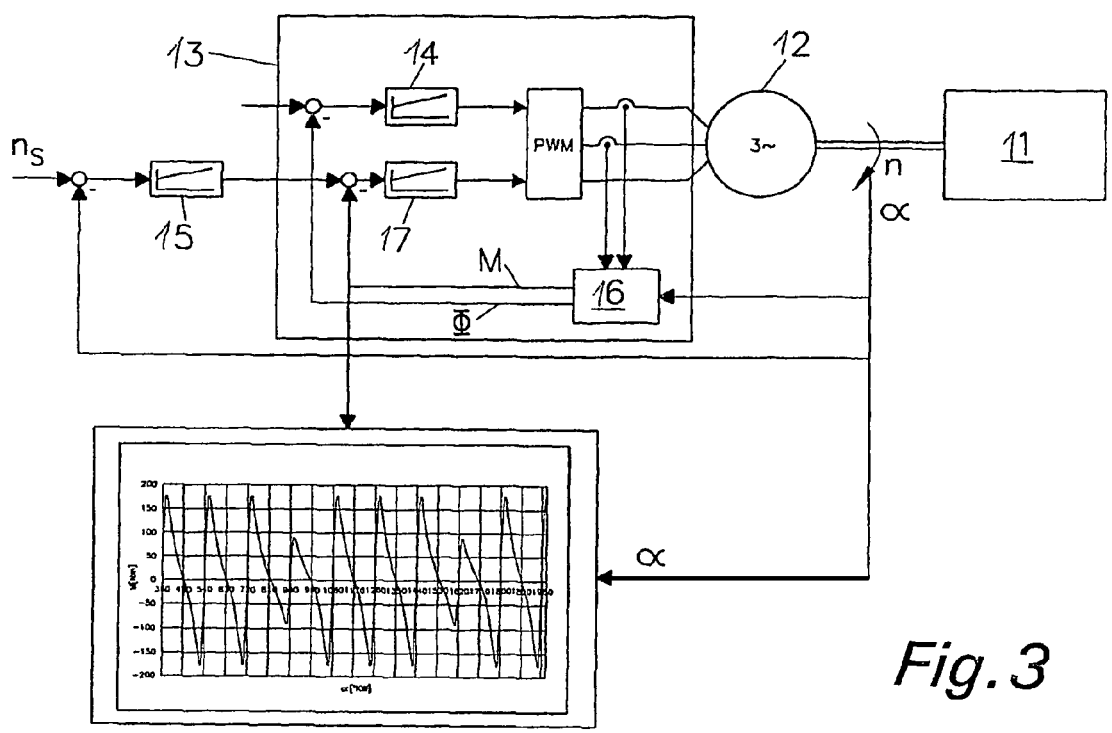
FIG. 3 schematically shows an arrangement for performing the method in accordance with the invention.

A variable-speed electric induction machine 12 is connected in a mechanically rigid way to an internal combustion engine 11 with several cylinders, as is shown in FIG. 3. The feedback control of the induction machine 12 occurs by means of a machine controller 13 through pulse-width modulation PWM. Reference numeral 14 relates to a flux controller and reference numeral 5 to a speed controller.

The torque M on the shaft is calculated in the field-oriented machine controller 13 for the induction machine 12 from the phase currents, the phase voltage and the speed n of the crankshaft of the internal combustion engine 11. The magnetic flux Φ is determined for measurement detection without any constructional interventions. The machine model 16 calculates the state quantities of torque M and magnetic flux Φ of the induction machine 12 which are made available as actual values to the flux controller 14 and the torque controller 17. The torque M forms the actuating variable in speed and voltage feedback control.

Figure 4:
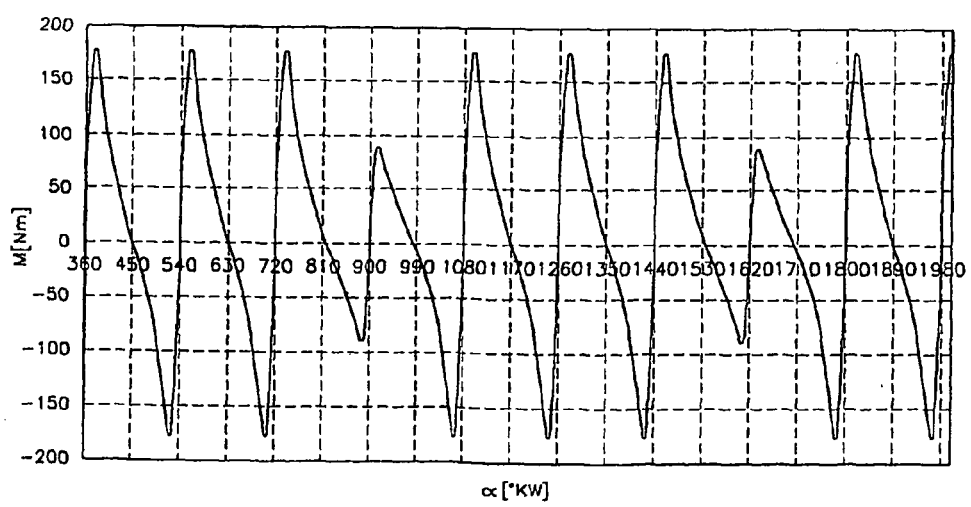
FIG. 4 shows a torque-crank angle diagram.

FIG. 4 shows the curve of the torque M over the crank angle α for a multi-cylinder internal combustion engine 11. The cyclic fluctuations of the torque M are caused by the compression of the individual cylinders. Differences in compression between the cylinders can be concluded from the clearly recognizable different torque peaks.

A rapid evaluation of the results can be achieved when a diagnostic function is implemented in the application software.

Figure 5:
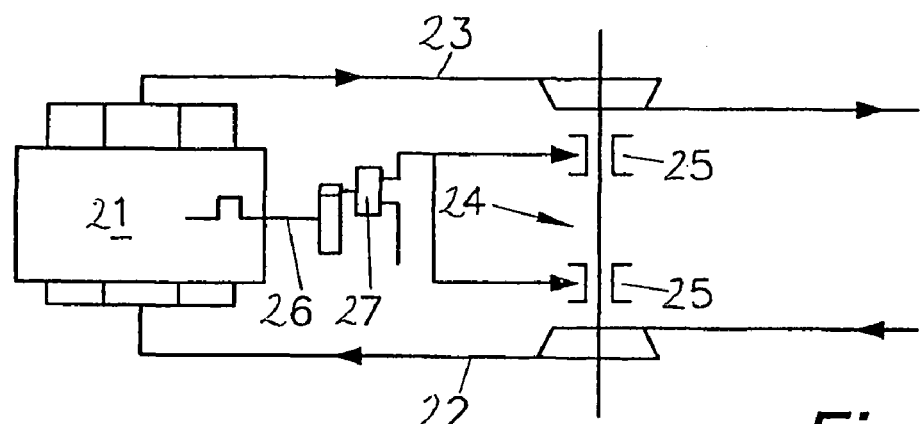
FIG. 5 shows an internal combustion engine for a hybrid vehicle.

FIG. 5 schematically shows an internal combustion engine 21 for a hybrid vehicle, comprising an intake strand 22 and an exhaust strand 23. An exhaust-gas turbocharger 24 is arranged in the intake and exhaust strand 22, 23 whose bearings 25 are supplied with lubricating oil by an oil pump 27 driven by the crankshaft 26 of the internal combustion engine 21. Especially in the case of hybrid vehicles there will be operating phases in which the internal combustion machine 21 is switched off directly after full-load operation. Since the oil pump 27 is usually driven with the other secondary drives via the crankshaft 26, it no longer supplies any lubricating oil to the bearings 25 of the exhaust-gas turbocharger 24 after the cut-off of the internal combustion engine, although the turbocharger 24 can still revolve at high speed. This can lead to a lack of lubricating oil of the bearings 25 of the exhaust-gas turbocharger 24 and to its destruction.

In order to avoid this, a minimum coasting period is determined from which a destruction-free cut-off is possible on the basis of the profile of output-specific engine parameters (moment, injected quantity), the speed profile of the internal combustion engine 21 and/or the speed of the exhaust-gas turbocharger 24. The progression of the specific quantities is examined in a time window and the coasting duration $\Delta t$ or the earliest possible cut-off time is determined. Once the command for cut-off has been given to the internal combustion engine 21, it will coast for a predetermined coasting period $\Delta t$ in order to supply the bearings 25 of the exhaust-gas turbocharger 24 sufficiently with lubricating oil via the oil pump 27.

The invention claimed is:

1. A method for operating a hybrid drive in a vehicle with an internal combustion engine and at least one electric machine connected thereto which is in connection with at least one energy storage device, comprising the step of operating the internal combustion engine in overload mode in an overload manner without taking into account emissions and fatigue strength in at least one exceptional operating situation of the hybrid drive.

2. The method according to claim 1, comprising operating the internal combustion engine in overload mode when at least one of a loading state of the energy storage device falls under a minimum value and demanded power is higher than a sum total of driving power of the internal combustion engine and the electric machine.

3. The method according to claim 1, comprising operating the internal combustion engine in overload mode in a hazardous situation.

4. The method according to claim 1, comprising operating the internal combustion engine in overload mode when full drive power of the internal combustion engine which is operated in normal load mode is demanded and additionally charge power for loading the energy storage device is to be provided.

5. The method according to claim 1, comprising operating the internal combustion engine in overload mode when respective drive power is demanded and support power for the internal combustion engine operated in normal load mode is not available by the electric machine.

6. The method according to claim 1, wherein the overload operation of the internal combustion engine is accomplished by additional enrichment of fuel-air mixture.

7. The method according to claim 1, wherein the overload operation of the charged internal combustion engine is accomplished by increasing boost pressure.

8. The method according to claim 1, wherein the overload operation is accomplished by at least one of adjusting control times and adjusting the stroke of charge-changing valves.

9. The method according to claim 1, wherein the overload mode is configured in such a way that with repeated moving-off or acceleration processes, consumed and recharged energy of the electric store are equal.

10. The method according to claim 1, wherein said at least one energy storage device includes at least one double-layer capacitor, and wherein with rapid charging processes the electric energy is stored in said at least one double-layer capacitor.

11. The method according to claim 10, wherein both at least one double-layer capacitor as well as at least one chargeable battery can be used as an energy storage device, with the chargeable battery being discharged and charged in normal electric driving operation and the double-layer capacitor is used in at least one of rapid high loading and discharging processes of the double-layer capacitor.

12. The method according to claim 1, wherein a displacement of load point is made via a transmission arranged in the drive train.

13. The method according to claim 12, wherein a load point displacement is performed by loading the electric machine or support by the electric machine.

14. The method according to claim 1, wherein the at least one electric machine is used in a supportive manner to bridge the turbo lag.

15. The method according to claim 1, wherein the vehicle is driven in at least one operating range only electrically by the electric machine.

16. The method according to claim 15, comprising operating the internal combustion engine from a drive train during electric operation by at least one clutch.

17. The method according to claim 15, comprising operating the internal combustion engine with reduced friction in dragged operation during electric operation.

18. A hybrid drive for a vehicle for performing the method according to claim 1, comprising a charged internal combustion engine, at least one electric machine, at least one electric energy storage device connected with the electric machine and a transmission in the drive train, wherein the internal combustion engine being operable in an overload mode in an overload manner without taking into account emissions and fatigue strength in at least one extraordinary operating system of the hybrid drive.

19. The hybrid drive (1) according to claim 18, wherein the control time and/or the valve stroke of at least one charge-changing valve is adjustable.

20. The hybrid drive according to claim 18, including at least one clutch in the drive train between at least one of said internal combustion engine and said electric machine, and between said electric machine and said transmission.

21. The hybrid drive according to claim 18, wherein the combustion engine is charged by at least one turbocharger.

* * * * *